3,579,495
ISOLATION OF ORGOTEIN FROM BLOOD
Wolfgang Huber, San Francisco, Calif., assignor to
Diagnostic Data, Inc., Palo Alto, Calif.
No Drawing. Continuation-in-part of application Ser. No.
815,175, Apr. 10, 1969, which is a continuation-in-part
of application Ser. No. 728,777, May 13, 1968. This
application Apr. 24, 1970, Ser. No. 31,791
Int. Cl. A61k 17/00; C07g 7/04
U.S. Cl. 260—115
5 Claims

ABSTRACT OF THE DISCLOSURE

Orgotein is isolated from lysed plasma-free erythrocytes by a series of steps which include removing the hemoglobin from the lysate, heating the remaining soluble proteins in the presence of buffer and divalent metal ion until the carbonic anhydrase is inactivated, removing the precipitate, and separating the orgotein protein from the supernatant liquid.

SUMMARY OF INVENTION

This invention relates to a novel process for the isolation of orgotein from blood. This is a continuation-in-part of application Ser. No. 815,175, now abandoned, filed Apr. 10, 1969, as a continuation-in-part of Ser. No. 728,777, filed May 13, 1968, now abandoned.

BACKGROUND OF INVENTION

Orgotein is the non-proprietary name adopted by the United States Council for Adopted Names for an isolated, pure, water-soluble, fairly low molecular weight anti-inflammatory protein metal chelate chelated with a divalent metal. (See J.A.M.A., May 26, 1969, Volume 208, No. 8; Huber et al., Abstracts Seventh Annual Meeting of the Society of Toxicology, Washington, D.C., March, 1968; Carson et al., Proceedings, Meeting Federation American Societies Experimental Biology, Atlantic City, N.J., April, 1970.) In prior filed U.S. patent application Ser. No. 576,454, filed Aug. 31, 1966, Belgium Pat. 687,828 and British Pat. 1,160,151, orgotein and a process for its production are claimed. An improvement on that process is claimed in U.S. patent application Ser. No. 657,866, filed Aug. 2, 1967. Stabilizing orgotein with saccharides, preferably sucrose, is the subject of the prior filed U.S. patent application Ser. No. 657,971, filed Aug. 2, 1967. Processes for the removal of traces of extraneous protein from orgotein isolated according to the process disclosed in Ser. No. 576,454 are claimed in applications Ser. No. 3,492 and Ser. No. 3,538, both filed Jan. 16, 1970. The present process is a simpler, less expensive process which employs a less expensive and more readily avaliable starting material.

The process of Ser. No. 576,454 is a multi-step process which, in its preferred form, isolates orgotein from beef liver by the successive steps of (a) slurrying finely ground fresh beef liver in cold water or buffer solution containing $Mn^{++}$ ion until substantially all the water soluble proteins are extracted; (b) fractionally precipitating a substantial portion of the dissolved proteins in the cold solution with acetone; (c) dissolving the precipitated portion in cold maleate buffer containing $Mn^{++}$ ions; (d) heating the resulting solution at or near 60° C. for about 20 minutes; (e) cooling the solution and removing the precipitated proteins; (f) precipitating the residual dissolved proteins in the cold solution with ethanol; (g) dissolving the soluble portion of the precipitate in cold maleate buffer solution containing $Mn^{++}$ ions; (h) dialyzing and lyophilizing the buffer solution; (i) dissolving the lyophilized solids in cold tris buffer containing $Mg^{++}$ ions and fractionally precipitating the proteins from the cold solution with ammonium sulfate; (j) dissolving the fractions insoluble in ammonium sulfate solution at 60 and 75% of saturation in cold tris buffer containing $Mg^{++}$ ions and chromatographing the solution through a column of Sephadex G-100, a cross-linked dextran resin of defined pore size; and (k) dialyzing against water containing a small amount of orthophenanthroline to remove buffer and excess $Mg^{++}$ and other metal ions.

The process of application Ser. No. 567,866, filed Aug. 2, 1967, is an improved process which, inter alia, uses buffer containing a mixture of $Mg^{++}$, $Cu^{++}$ and $Zn^{++}$ ions, rather than $Mg^{++}$ alone.

Orgotein is readily soluble (to 50 mg./ml.) in water and common aqueous buffers, pH 6.5–10.0. Orgotein's metal ion content and composition are related to its pharmacodynamic activity. Bivalent cations with ionic radii of 0.6–1.0 A. are the most effective. A mixture of Cu, Mg, and Zn at a total content of 2–4 gram atoms per mole produces the highest level of physiological activity. The relative amounts of each of the three metals can vary broadly within this total. Most samples also contain trace amounts of Ca, Fe, and Si as the only other metals detectable by emission spectroscopy. All metals can be removed by prolonged dialysis against $10^{-2}$ M EDTA or $10^{-3}$ M orthophenanthroline. At levels below 2 gram atoms per mole, the biological effectiveness is diminished, and below 1 gram atom per mole the protein progressively precipitates, losing biological activity. The metal ions thus appear to play a decisive role in maintaining the molecular conformation essential for biological activity, acting as "locking pins" by producing intra-molecular cross links. Differences in affinity for buffer anions probably explain why, at identical strength, the orgotein is less stable in certain buffers (phosphate, borate) than in others (Tris, maleate, EDTA).

Orgotein defines a family of protein congeners having a characteristic combination of physical, chemical, biological and pharmacodynamic properties. Each of these congeners is characterized physically by being the isolated, substantially pure form of a globular, buffer and water-soluble protein having a highly compact native conformation which, although heat labile, is stable to heating for several minutes at 65° C. when dissolved in a buffer solution containing a salt of a divalent metal having an ionic radius of 0.60 to 1.00 A. and which on gel electrophoresis gives a characteristic multiple-band pattern. Chemically, each is characterized by containing all or all but one of the essential aminoacids, a small percentage of carbohydrate, no lipids, 0.1 to 1.0% metal content provided by one to 4 gram atoms per mole of one or more chelated divalent metals having an ionic radius of 0.60 to 1.00 A., and substantially no chelated monovalent metals or those that are cell poisons in the molecule. Pharmacodynamically, each of the congeners is characterized by being a non-toxic, only weakly antigenic injectable protein whose pharmacodynamic properties include anti-inflammatory activity which, like its compact conformation, is related to its chelated divalent metal content. Immunological relatedness of an orgotein congener is sufficient to enable its antibodies prepared in the rabbit or other suitable animal to recognize as an antigen one or more other orgotein congeners and/or for one or more of the antibodies to other orgotein congeners to recognize it as an antigen, as evidenced, for instance, in gel immunoelectrophoresis and/or gel immunodiffusion. Although some of the physical and chemical properties and the type and degree of pharmacodynamic efficacy of orgotein vary from congener to congener, all orgotein congeners possess the above combination of properties.

The aminoacid composition of orgotein congeners is remarkably consistent irrespective of the source from which it is isolated according to the process of this invention. The close relatedness of orgotein congeners is apparent from the surprisingly small variances in the aminoacid analyses for a protein isolated from such diverse sources as beef liver and chicken red blood cells, as shown in Table I below.

Table II lists the aminoacid residues of several orgotein congeners as calculated from their apparent molecular weight. Table III lists other properties of various orgotein congeners isolated from a buffer solution containing a mixture of $Mg^{++}$ ($10^{-3}$ M), $Cu^{++}$ ($10^{-4}$ M) and $Zn^{++}$ ($10^{-5}$ M) ions.

TABLE I.—AMINO ACID COMPOSITION OF ORGOTEIN CONGENERS

[Grams per 100 grams protein]

| Aminoacid | Beef liver | Red blood cells (RBC) | | | | | |
|---|---|---|---|---|---|---|---|
| | | Beef | Sheep | Horse | Rabbit | Chicken | Human |
| Alanine | 6.4 | 6.3 | 6.2 | 6.0 | 6.0 | 7.3 | 7.1 |
| Arginine | 2.9 | 2.6 | 3.2 | 2.0 | 2.8 | 2.6 | 2.6 |
| Aspartic acid | 10.7 | 11.2 | 11.4 | 11.3 | 10.8 | 11.4 | 11.8 |
| Cystine/2 | 2.5 | 2.0 | 1.8 | 1.9 | 1.7 | 3.1 | 2.4 |
| Glutamic acid | 7.8 | 7.7 | 7.2 | 10.8 | 8.0 | 8.3 | 8.8 |
| Glycine | 16.4 | 16.3 | 17.2 | 16.1 | 17.1 | 17.7 | 16.1 |
| Histidine | 4.0 | 5.0 | 4.5 | 5.7 | 5.3 | 5.4 | 4.5 |
| Isoleucine | 5.2 | 5.7 | 5.8 | 4.9 | 4.9 | 4.8 | 5.3 |
| Leucine | 6.0 | 5.4 | 5.5 | 6.1 | 6.9 | 4.7 | 6.4 |
| Lysine | 6.6 | 6.6 | 8.1 | 8.1 | 6.7 | 6.5 | 7.2 |
| Methionine | 1.2 | 0.8 | 0.6 | 1.2 | 0.9 | 1.0 | 0.3 |
| Phenylalanine | 2.8 | 2.5 | 2.2 | 3.2 | 2.8 | 2.6 | 2.5 |
| Proline | 4.0 | 4.1 | 4.8 | 3.7 | 4.2 | 4.1 | 3.7 |
| Serine | 5.4 | 5.3 | 4.7 | 4.3 | 5.7 | 4.6 | 6.0 |
| Threonine | 7.8 | 7.7 | 6.2 | 4.9 | 6.6 | 5.8 | 5.5 |
| Tryptophan [1] | 0.3 | 0.2 | 0.3 | 0.3 | Nil | 0.3 | N.D. |
| Tyrosine | 0.6 | 0.7 | 0.6 | 0.3 | 0.2 | 0.7 | 0.3 |
| Valine | 9.7 | 10.0 | 9.1 | 9.7 | 9.8 | 9.4 | 9.6 |
| Total | 100.3 | 100.1 | 99.4 | 100.4 | 100.4 | 100.3 | |

[1] Determined spectrophotometrically according to H. Edelhoch, Biochem., 6, 1948 (1967).

TABLE II.—AMINOACID PROFILE OF ORGOTEIN CONGENERS

[Residues per mole]

| Aminoacid | Bovine liver | Red blood cells (RBC) | | | | | | Range | Average |
|---|---|---|---|---|---|---|---|---|---|
| | | Bovine | Horse | Sheep | Rabbit | Chicken | Human | | |
| Lysine | 20.5 | 20.5 | 27.3 | 25.1 | 20.8 | 20.1 | 22.3 | 20–27 | 22.4 |
| Histidine | 12.4 | 15.5 | 19.2 | 14.0 | 16.4 | 16.7 | 13.9 | 12–19 | 15.4 |
| Arginine | 9.0 | 8.1 | 6.3 | 9.9 | 8.9 | 8.1 | 8.1 | 6–10 | 8.3 |
| Aspartic | 33.2 | 34.7 | 33.5 | 35.3 | 33.5 | 35.3 | 36.6 | 33–37 | 34.7 |
| Threonine | 24.2 | 23.9 | 16.1 | 19.2 | 20.5 | 18.0 | 17.1 | 16–24 | 19.9 |
| Serine | 16.7 | 16.4 | 14.9 | 14.6 | 17.7 | 14.3 | 18.6 | 14–19 | 16.2 |
| Glutamic | 24.2 | 23.9 | 31.0 | 22.3 | 24.8 | 25.7 | 27.3 | 22–31 | 25.6 |
| Proline | 12.4 | 12.7 | 11.5 | 14.9 | 13.0 | 12.7 | 11.5 | 12–15 | 12.7 |
| Glycine | 50.8 | 50.5 | 49.3 | 53.3 | 53.0 | 54.9 | 49.9 | 49–55 | 51.7 |
| Alanine | 19.9 | 19.5 | 18.3 | 19.2 | 18.6 | 22.6 | 22.0 | 18–23 | 20.0 |
| Cystine-1/2 | 7.8 | 6.2 | 6.2 | 5.6 | 5.6 | 9.6 | 7.5 | 6–10 | 6.9 |
| Valine | 30.1 | 31.0 | 27.6 | 28.2 | 30.4 | 29.1 | 29.8 | 28–31 | 29.5 |
| Methionine | 3.7 | 2.5 | 5.1 | 1.9 | 2.8 | 3.1 | 0.9 | 1–5 | 2.9 |
| Isoleucine | 16.1 | 17.7 | 14.6 | 18.0 | 15.2 | 14.9 | 16.4 | 15–18 | 16.0 |
| Leucine | 18.6 | 16.7 | 18.3 | 17.0 | 21.4 | 14.6 | 19.8 | 15–21 | 18.1 |
| Tyrosine [1] | 1.9 | 2.2 | 1.6 | 1.9 | 0.9 | 2.2 | 0.8 | 1–2 | 1.6 |
| Phenylalanine | 8.7 | 7.8 | 9.0 | 6.8 | 8.8 | 8.1 | 7.8 | 7–9 | 8.2 |
| Tryptophan [2] | 0.9 | 0.7 | 0.9 | 0.9 | Nil | 0.9 | N.D. | 0–1 | 0.7 |
| Total | 311.1 | 310.5 | 310.6 | 308.1 | 312.3 | 310.9 | 310.3 | | 310.8 |

[1] Average of aminoacid analysis and spectrophotometric determination.
[2] Spectrophotometric determination.

TABLE III.—PHYSICO-CHEMICAL CONSTANTS OF ORGOTEIN CONGENERS

| | Bovine liver | Red blood cells (RBC) | | | | |
|---|---|---|---|---|---|---|
| | | Bovine | Horse | Sheep | Rabbit | Chicken |
| Isoionic point | 5.18 | 5.42 | 5.60 | 5.71 | 5.29 | 5.28 |
| $A_{280}$ 1% glycine buffer, pH 8.5 | 2.3 | 2.2 | 2.3 | 2.5 | 1.1 | 2.9 |
| Lipids | Nil | Nil | Nil | | | |
| Carbohydrates [1] | 0.59 | 0.88 | 0.57 | 0.62 | 0.99 | |
| Immune (Ag/Ab ratios) [2] | 1:400 | 1:400 | 1:16 | 1:200 | 1:1 | 1:1 |
| Metals (GAPM) [3]: | | | | | | |
| Copper | 1.14 | 10.7 | 0.94 | 0.91 | 1.33 | 1.18 |
| Magnesium | 0.44 | 0.47 | 0.32 | 0.30 | Nil | 0.22 |
| Zinc | 2.08 | 1.86 | 1.48 | 1.97 | 2.19 | 2.28 |
| Calcium | 0.03 | 0.05 | 0.04 | 0.13 | 0.07 | 0.07 |
| Iron | 0.02 | 0.02 | Nil | 0.02 | 0.07 | 0.04 |
| Manganese | 0.03 | Nil | 0.01 | Nil | Nil | 0.02 |
| Silicon | 0.15 | 0.37 | 0.08 | 0.34 | 0.37 | 0.31 |
| Others | Nil | Nil | Nil | Nil | Nil | Nil |
| Bioassay (ungar) [4]: | | | | | | |
| 0.4 mg./kg. | 46.24 | 44.10 | 45.71 | 46.61 | 39.86 | 45.33 |
| 1.0 mg./kg. | 35.80 | 36.50 | 35.94 | 34.14 | 36.50 | 38.27 |

[1] Modified orcinol procedure, expressed as percent glucose.
[2] Anti-bovine RBC rabbit DEAE-purified γ-globulin.
[3] Emission spectroscopy.
[4] Max. mean acceptance values at 4 animals: 57.74 (0.05); 53.89 (0.01); 49.66 (0.001).

As also shown in Table 1, orgotein is formed of all or all but one essential aminoacids. The aminoacid residue content does not vary greatly from congener to congener. With most congeners a substantial variation (more than 6 residues) in the number of residues of any aminoacid occurs in no more than 3 of the aminoacids.

The apparent molecular weight of beef liver orgotein as determined by gel filtration using Sephadex G-200 is about 34,000. Orgotein isolated from beef red blood cells (RBC) was found to have an apparent molecular weight of about 34,500, a variation well within the limit of error of the method. By gel filtration, the apparent molecular weight of horse RBC orgotein is 33,500; sheep RBC, 32,000; rabbit RBC, 34,000. These values are also within the limits of error for this method. The molecular weight value by G-200 gel filtration obtained for the congener from chicken RBC is 29,000. This apparent variation in molecular weight is probabaly due to the fact that gel filtration measures molecular volume and a difference in the conformation of a congener will cause a difference in molecular volume and thus an apparent difference in molecular weight values. In contrast, molecular weights calculated directly by aminoacid analysis indicate most congeners are quite close to beef liver orgotein in molecular weights.

Original molecular weight determinations established the molecular weight of beef liver orgotein at about 32,500. Subsequent studies indicated a lower figure but exhaustive studies have now established that beef liver orgotein as a total molecular weight of about 34,400 ($\pm 4\%$). This molecular weight is based on the average of the values obtained by osmometry, sucrose density gradient, sedimentation equilibrium, aminoacid profile and gel filtration on a Sephadex G-200 (Pharmacia Inc.) column 90 x 2.5 cm., eluted with saline and phosphate buffer (pH 7.4) using ribonuclease, chymotrypsin, albumin and gamma globulin as standards. Based on this molecular weight and about a 0.3% ash content, the best values for the protein chelate are a total of about 311 aminoacid residues and about 2-4 grams atoms of metals per molecule.

In the ultra-centrifuge, orgotein in normal saline moves as a uniform, sharp band, with a sedimentation coefficient (beef liver orgotein) of about $3.32 \pm 0.05$ Svedberg Units.

Beef liver orgotein has an isoelectric point at about pH $5.5 \pm 0.2$, and an isoionic point at $5.35 \mp 0.1$. The isoionic point of other orgotein congeners varies somewhat, e.g., from about 5.0 to 5.7. The isoelectric point was determined by electrophoresis on cellulose acetate at different pH's using citrate-phosphate buffer. The isoionic point was determined according to J. Riddiford et al., Biochem. 239, 1079 (1964). The protein was throughly dialyzed to free it completely from all electrolytes and then lyophilized. 25.8 mg. of the lyophilized product were dissolved in 5 ml. deionized water, placed in a cell maintained at 25° C. under a nitrogen atmosphere and allowed to come to a stable pH (about 40 to 60 minutes).

The presence of carbohydrate in the protein product was first detected by disc gel electrophoresis, using the Schiff test (W. F. McGuckin and B. F. McKenzie, Clin. Chem. 4, No. 6, December 1965) on acrylamide and cellulose acetate electropherograms of orgotein. Tests with typical sugar reagents after prior acid hydrolysis, indicate the presence in beef liver orgotein of about 0.5–1% carbohydrate, expressed as commonly is done, in terms of glucose. The carbohydrate appears to be covalently bonded to the protein. The carbohydrate, however, is probably a pentose, methylpentose and/or glucuronic acid rather than a hexose as evidenced by known colorimetric reactions (Z. Dische, Methods in Carbohydrate Chemistry, 1, 486, Academic Press, N.Y. (1962)). Heptoses, 2-deoxypentoses, hexosamines and sialic acid also could not be detected. A typical elemental analysis of beef liver orgotein is C, 50.05; H, 7.92; O, 25.55; N, 16.00; S, 1.10; P, nil; Ash, <1%.

Gas chromotography and electrophoresis tests establish that orgotein is not a lipoprotein. It contains less than 0.01% lipid phosphorous, less than 0.1% cholesterol, less than 0.05% galactolipid and no detectable water-soluble glycolipids.

The orgotein congeners analyzed to date have numerous titrable $\epsilon$-amino groups but few titrable —SH and —OH (tyrosyl) groups. For example, beef liver orgotein and beef RBC orgotein contain one titrable OH (tyrosyl) group (N-acetylimidazole titration), one titrable-SH (p-mercuribenzoate) and 15–16 (beef liver) and 16–17 (beef RBC) $\epsilon$-amino groups (trinitro benzene sulfonic acid titration).

Orgotein has at pH 7 an infrared spectrum curve typical of proteins.

Beef liver orgotein has a corrected $A_{280}$ (pH 7.0 buffer) of $0.23 \pm 0.02$ (1 mg./ml.). In Ser. No. 576,454, the $A_{280}$ ultraviolet absorbance of substantially pure beef liver orgotein was reported as 0.585 (1 mg./ml.). Because the samples of orgotein described therein had a purity of at least 94%, this high absorbance was attributable to the tyrosine and tryptophane content of orgotein. Subsequent analytical studies have established that beef liver orgotein has only 3 such groups, which are too few to account for this high absorbance at $A_{280}$.

In the applications of W. Huber Ser. No. 3,492 and Ser. No. 3,538, both filed Jan. 16, 1970, and entitled "Orgotein Purification Process," there are described processes for removing traces of a tenacious extraneous protein in the samples of orgotein produced according to the process of Ser. No. 576,454. It was found that samples of orgotein which are free of this extraneous protein have a substantially lower $A_{280}$, i.e., <0.3. Thus, the high $A_{280}$ absorbance of the orgotein produced according to the process of Ser. No. 576,454 is due to the presence of this tenacious extraneous protein, which is rich in tyrosine and tryptophane residues.

In the visible spectrum, samples of orgotein which contain $Cu^{++}$ in the molecule exhibits a peak at 407 m$\mu$, which peak confirms the presence of chelated copper in the molecule.

In gel-electrophoresis, e.g., on polyacrylamide and agarose, orgotein gives a typical pattern showing multiple closely spaced bands at various pH's and at low ionic strength. At higher ionic strengths, they tend to contract into a single band. This multi-band electropherogram pattern is characteristic of orgotein congeners but the location o fthe bands relative to the origin can vary from congener to congener. A typical electropherogram pattern obtained for orgotein from beef liver in thin film, argarose gel is given in the table below. All values are approximate.

Conditions of electrophoresis:
  Agarose gel:—Analytical Chemists, Inc.
  Buffer:—0.02 M tris; 0.15 M glycine; $1.2 \times 10^{-4}$ M
    EDTA 0.08% Thymol pH 8.45; conductivity
    280$\mu\nu$ (mhos)
  Power conditions:—3·5 ma. 300→370 v.

| Band: | Approximate band width, mm. | Approximate distance from origin mm.[2] | Relative intensity |
|---|---|---|---|
| 1[1] | 3.0 | 2.8 | 45.1 |
| 2 | 3.2 | 9.5 | 38.2 |
| 3 | 2.5 | 15.8 | 16.6 |

[1] Closest to origin (most cathodic).
[2] Center of origin through to center of band.

OBJECTS OF THE INVENTION

It is an object of this invention to provide a novel process for the isolation of orgotein from a more readily available starting material. Another object is the provision of a process in which orgotein is isolated in higher over-all yield than heretofore was achieved. It is another object to provide a process which is simpler, less time-consuming and less expensive to perform. Other objects will be apparent to those skilled in the art to which this invention pertains.

SUMMARY OF THE INVENTION

According to this invention, the orgotein protein is obtained free of other proteins from lysed plasma-free erythrocytes by separating the hemoglobin from the lysate, heating the homoglobin-free lysate, in the presence of buffer and divalent metal ion, preferably one having an atomic radius from 0.69 to 0.80 A., until the carbonic anhydrase is inactivated, and separating the orgotein protein from the resulting reaction mixture.

DETAILED DESCRIPTION

The processes of Ser. No. 576,454 and Ser. No. 657,866 for isolating orgotein from a mixture of proteins are fractionation processes comprising a plurality of steps conducted below room temperature and a heating step in which the impure orgotein is heated in a buffer solution containing divalent metal ions until a portion of proteins precipitate therefrom, the heating is then discontinued and the solution cooled, the precipitated proteins are removed and the orgotein protein is separated from the supernatant. The process of this invention is an improvement in such a process and comprises (a) employing erythrocytes as the source of the orgotein protein; (b) lysing the erythrocytes; (c) separating the hemoglobin from the lysate; and (d) heating the separated lysate containing the orgotein protein in the heating step until the carbonic anhydrase therein is inactivated.

It was surprising to discover that orgotein could be isolated from erythrocytes substantially free from other proteins because erythrocytes are a storehouse of other proteins, for instance, at least 82 enzymes have been identified in human red cells. However, their presence, along with the chromo-protein hemoglobin, other proteins, polypeptides, phospholipids, cholesterol, and inorganic ions, present no serious purification difficulties when following the process described herein.

ISOLATION CONDITIONS

Orgotein, being a protein, is heat labile. Therefore, except for the heating step described hereinafter, all isolation steps are preferably conducted at below room temperature, more preferably below 5° C. It is known that orgotein is considerably more stable in the presence of buffer solution containing divalent metal ions, especially those having an atomic radius from 0.69 to 0.80 A. Therefore, after the orgotein protein is free from hemoglobin by lysis, all steps thereafter, except the isolation of orgotein in dry state, are preferably conducted in the presence of such buffer. See Belgium Pat. 687,828.

STARTING MATERIAL

Erythrocytes, i.e., red blood cells, preferably from mammals, are employed. Beef red blood cells are especially preferred as beef blood is inexpensive, is readily available from slaughter houses or by bleeding live cattle, and is a rich source of orgotein protein. Fresh beef blood or blood stabilized, e.g., with ethylenediamine tetraacetic acid (EDTA), shortly after slaughter is preferred as the yield of orgotein insolable from blood drops as the blood ages upon storage.

Congeners of orgotein can be obtained from red blood cells of species of mammals and other animals other than bovine, e.g., horses, goats, sheep, pigs, rabbits, humans, chickens, etc. Orgotein obtained from bovine blood is known to be highly active and for this reason also bovine red cells are the preferred starting material.

(a) Red blood cell isolation

Red blood cells, which on the average make up about 35–45% by volume and about 39–50% by weight of whole blood of many mammals, are separated from the plasma of the blood by centrifuging although gravity alone will suffice. Washing the separated cells and re-centrifuging removes residual plasma adhering to the compacted cells. Saline or buffer can be used, of an ionic strength to avoid the risk of premature lysis.

(b) Lysis

The cell contents are released from the plasma-free red cells by lysis. Conventional procedures can be used. See M. Moskowitz and M. Calvin, Exp. Cell Res., 3, 33 (1952); S. S. Bernstein et al., J. Biol. Chem., 122, 507 (1938). Simple lysis with deionized water at 0–5° C. is preferred. Detergents and/or surface active agents may be present in the water if desired. Buffer and other ions, if present in the water, ought be present in low concentrations to avoid premature lysis, e.g., one or more of $Mg^{++}$ at about $10^{-3}$ M, $Cu^{++}$ at about $10^{-4}$ M and $Zn^{++}$ at about $10^{-5}$ M concentration, may be present alone or with tris or borate buffer at less than $5 \times 10^{-3}$ M concentration.

ORGOTEIN ISOLATION (a) Hemoglobin removal

There are numerous ways known in the art for removal of the hemoglobin released from the red blood cells by lysis. See E. R. Waygood, Methods in Enzymology, Vol. 2, 836 (1955), Academic Press. Some of the known processes for doing so, e.g., filtration through diethylamino-cellulose, or other ion exchange materials, can have an adverse effect upon the orgotein protein. Therefore, solvent precipitation is preferred. However, ammonium sulfate or other inorganic salts can also be used.

Hemoglobin per se does not precipitate readily from the lysate. However, water-immiscible organic solvents having densities greater than water, preferably the halogenated aliphatic solvents, e.g., methylene chloride, ethylene chloride, chloroform, carbon tetrachloride, facilitate its precipitation, apparently by forming a complex with the hemoglobin. In order for this complex to form efficiently, the organic solvent must be in intimate contact with the hemoglobin. Because the organic solvent used is water-immiscible, a water-miscible organic solvent is usually used with the immiscible solvent to bring a small proportion of the immiscible solvent into the aqueous phase. The lower-alkanols, e.g., methanol, ethanol, n-propanol, i-propanol, t-butanol, as well as other water miscible solvents, e.g., dioxane, tetrahydrofuran, acetone, methyl ethyl ketone, etc., can be used for this purpose.

The removal of hemoglobin preferably is as complete as possible to ensure that the isolation of the orgotein protein is not unnecessarily encumbered by the presence of extraneous proteins. Therefore, the treatment with precipitating solvent ought be continued until the supernatant liquid is free from hemoglobin color.

One or more back-washes of the precipitated hemoglobin is desirable to increase the yield of isolated orgotein. On the average, from 1,000 ml. of starting packed red blood cells, 6,900 mg. of a protein fraction containing the orgotein protein was present in the supernatant separated from the precipitated hemoglobin. Washing the separated hemoglobin once with deionized water removed an additional 1,300 mg. occluded on the precipitated hemoglobin. Additional washes may remove more orgotein protein containing material, though usually in much lower amounts.

Precipitation at lower temperatures is preferred to avoid denaturation of the orgotein protein. Therefore, this step is preferably conducted below 5° C., more preferably below 0° C., and desirably about −15° C.

At this stage, it is sometimes desirable to dialyze and lyophilize the supernatant to check for orgotein content and/or purity or to pool lots before further purification. If so, this can be done by employing conventional procedures. The lyophilizate is quite stable but refrigeration, preferably below 5° C., is desirable for storage.

(b) Removal of heat labile proteins

Heat labile proteins, including enzymes, are removed by heat denaturation after hemoglobin removal. Carbonic anhydrase is a prominent component of such heat labile proteins which remain after the hemoglobin is removed. The hemoglobin-free supernatant is heated until the carbonic anhydrase is inactivated. For a review on the sensitivity of carbonic anhydrase to heat, see R. P. Davis, The Enzymes, vol. 5, 545 (1961) Academic Press, New York City.

When the carbonic anhydrase is inactivated, most all of the other heat labile enzymes and non-enzymatic proteins in the supernatant are inactivated also. At 60°, heating longer than 20 minutes is usually required to inactivate the carbonic anhydrase and the other heat labile proteins. At 65°, 10–15 minutes suffices. Heating for 20 minutes or even longer at 60–65° C. does not significantly affect the final yield of pure orgotein. However, heating at 70° C. for one hour at this stage destroys at least half the orgotein. If heating is conducted for 10–20 minutes at 65° C., the orgotein is substantially unaffected by this treatment, if protected by a buffer solution containing divalent metal ions having an atomic radius from 0.69 to 0.80 A. At this process stage, for example, such a buffer solution of orgotein does not cloud, an evidence of destruction by denaturation, when heated for 20 minutes at 65° C. At 80° C. clouding begins within ten minutes and within two minutes at 100° C. At 37° several hours are required before clouding begins.

After the carbonic anhydrase has been inactivated by heating, the mixture is then cooled to well below room temperature as quickly as possible to ensure optimum yields of orgotein. The precipitated proteins are removed by filtration or centrifugation and can be discarded. The supernatant remaining after removal of the precipitated proteins contains the orgotein protein as the predominant protein. The orgotein protein can be isolated therefrom by dialysis, to remove buffer ions and any non-chelated metal ions, and then lyophilizing the protein solution, which will produce a powder of impure orgotein protein.

ORGOTEIN PURIFICATION

After the removal of the precipitate formed in the heating step, the orgotein protein in the resulting solution or isolated therefrom by dialysis and lyophilization can be purified by resin filtration, preparative electrophoresis and/or gel filtration through a polymer which acts as a molecular sieve, for example, in the manner described in Belgium Pat. 687,828. The major remaining organic impurities have substantially lower molecular weight than orgotein and their removal can be accomplished simply and rapidly by gel filtration, as can be the removal of traces of albumin due to incomplete plasma removal.

The following examples are illustrative of the process of this invention.

Example 1.—Isolation of orgotein from beef blood

Fresh beef blood was centrifuged, e.g., at about 2,600 to 5,000× G for 10 minutes at 0° C. and the plasma decanted. The red blood cells were then washed at least twice and preferably repeatedly with 2 to 3 volumes of 0.9% saline solution. The washed red blood cells were lysed by mixing with 1.1 volumes of cold deionized water containing 0.02% detergent (Saponin). After a minimum of 30 minutes at 4° C. with stirring, 0.25 volume (per volume of hemolysate) of ethyl alcohol at −15° C. was slowly added while stirring followed by 0.31 volume (per volume of hemolysate) of chloroform, also at −15° C. Stirring was continued for about 15 minutes at −5° C. or below, at which time, the mixture was a thick paste. The hemoglobin precipitation was carried out in a cold bath which was kept at below −10° C. After the paste had stood for a further 15 minutes at 4° C., 0.2 volume of cold 0.15 M NaCl solution was added, giving an easily poured suspension. The precipitate and excess chloroform were removed by centrifuging at about 12,000 to 20,000× G at about −10° C. for 10 minutes. The supernatant liquid was removed and if desired, filtered and briefly dialyzed against cold-deionized water, prior to lyophilization.

The alcohol-chloroform precipitate was dislodged, chloroform was removed, the pellet broken up and re-extracted with about an equal amount of deionized water by blending the precipitate and the water in a blender and thereafter centrifuging. The re-extraction solution was dialyzed and lyophilized with the main extract. If the process proceeds normally, the re-extraction of the precipitated hemoglobin usually yields up to 30% of protein mixture present in the original supernatant. An additional re-extraction may give an additional 5–15%.

The lyophilized material was re-dissolved in 0.025 M tris-glycine buffer containing 0.001 M $Mn^{++}$ at pH 7.5 (usually to a concentration of 20 mg./ml.). The solution was heated at or near 65° C. for about 15 minutes. This step removes the carbonic anhydrase and other heat labile proteins from the solution. After heating, the solution was rapidly cooled in an ice bath to 5° C. The solution was then centrifuged at 20,000× G at 0° C. for 10 minutes to remove the precipitate. Filtration through "Versapore" works equally well. The supernatant was thoroughly dialyzed against deionized water to remove excess metal ions and buffer and then lyophilized. The resulting solid consists largely of orgotein.

Gel filtration

Sephadex G–75 is slowly added to warm deionized water (approximately 60° C.) with continuous stirring. The beaker containing the mixture is then placed in a 60° C. water bath for five hours and 45 minutes, removed and allowed to stand for one hour at room temperature. The supernatant and fines are decanted by suction. Buffer is added to the swollen Sephadex gel at four to five times its volume. The Sephadex gel is stirred, allowed to settle, and the fines and supernatant removed by suction. Fresh buffer is again added to the swollen gel, and the above process repeated four times. The final suspension is chilled to 4° C. and then deaerated under reduced pressure before use.

A recirculating column made of polymethacrylate was used. The column is 1050 mm. long and has an internal diameter of 32 mm. In filling the column with degassed buffer, special care is taken to insure that no air bubbles are trapped near the filter and on the sides of the column. The buffer filled column is then moved into the cold room and clamped into a vertical position with the aid of a carpenter's level. After equilibration in the cold room, the gel slurry is poured into a funnel connected to the top of the column with continued mechanical stirring. When a layer of Sephadex a few centimeters thick has formed on the bottom of the column, the outlet at the bottom of the column is opened to allow an even flow. During the packing, a rising horizontal surface of gel in the tube indicates proper uniformity in packing. After approximately 95 cm. of gel has settled, the excess gel and buffer are removed. After the top surface of the gel has completely settled, the top of the column is closed with a plunger fitted with a filter disc. Buffer is then circulated through the column for two days in order to stabilize the bed. Flow rate is maintained at 10 ml. per hour. Final bed volume, $(V = \pi r^2 h = (3.14)(1.6\ cm.)^2(96.5\ cm.) = 775.7\ cc.$ The lyophilizate from the heating step is dissolved in buffer at about 20 mg./ml. Insolubles, if present, are removed by centrifugation or filtration. The clear solution is loaded on the column using an LKB selector valve (Model No. 4911B).

All column runs are performed at 4° C. The buffer used is 0.03 M Tris-HCl, pH 7.1, 0.005 M in glycine, containing $10^{-3}$ M $Mg^{++}$, $10^{-4}$ M $Cu^{++}$ and $10^{-5}$ M $Zn^{++}$.

The protein solution is loaded from the bottom. Ascending buffer flow rate is maintained at 10 ml. per hour. Protein content of fractions is determined by absorbance at 280 mμ.

The elution volume for each protein is determined either volumetrically or gravimetrically, or both.

The first major peak which emerges from the column is orgotein. This generally emerges in the range of 300–400 ml. of total eluate. These fractions are combined for further processing. If plasma proteins are still present, several smaller peaks precede the orgotein peaks. Following the main, well defined peak may be a shoulder which is believed to be an orgotein congener and which need not be separated. However, it can be separated by collecting the appropriate eluate fractions separately. Lower molecular weight protein impurities emerge from the column substantially later, upon further elution. They are removed to clear the column for a subsequent run.

Buffer and exces metal ion removal

The orgotein solution obtained from the gel filtration is filtered through a column of mixed bed resin Amberlite MB–1 Monobed gel-type Ion Exchange Resin, (Rohm & Haas), a styrene-divinyl benzene strongly acidic ($-SO_3-H^+$ strongly basic ($-N^+(CH_3)_2CH_2CH_2OH^-$) group-containing mixed copolymer which reduces buffer and unbound $Mg^{++}$, $Cu^{++}$ and $n^{++}$ ion concentrations to less than $10^{-7}$ M. Alternatively, this can be done by dialysis.

A column 1.45×45 inches is half filled with demineralized water from which all air bubbles have been removed. A slurry of the resin in air-free demineralized water is poured gently into the column and allowed to settle. The column is then backwashel several times with demineralized water to constant pH (ca. 7.0 and ionic strength (conductance about 1.0 mho) of the effluent. The final bed height is 33 inches, giving a bed volume of 58.3 cubic inches (957 milliliters) and total exchange capacity of 440 milliequivalents, based on a factor of 0.46 given by the manufacturer for this resin.

The eluate from the gel filtration step containing the orgotein is concentrated, if necessary, to a protein content of 8–10%. This solution is carefully loaded onto the top of the column of the mixed bed exchange resin and thereafter developed with demineralized water. The flow rate is aljusted to about 20 milliliters per minute and the appearance of the protein in the eluate is followed by ultraviolet absorption ($A_{280}$). The eluate is collected in 25 to 50 milliliter fractions. The desired protein generally appears in the fourth to twelfth fractions. Buffer-$Me^{++}$ concentration drops well below $10^{-7}$ M, as indicated by a drop of conductivity from 4,000 to 5,000 micromho before column filtration to 1.5–2.5 micromho thereafter.

For the preparation of a sterile solution of orgotein for injection purposes, fructose, sucrose or other suitable saccharide disclosed in Ser. No. 657,971 is added to the resulting solution to a concentration of at least 2 parts saccharide per part orgotein. The solution is then sterilized by ultra-filtration and filtered into pre-sterilized ampules or vials under sterile conditions. The resulting product is then lyophilized aseptically to produce a sterile product stable at room temperature for extended periods.

One or more of the following variations can be made in the conditions employed in Example 1 with substantially the same results.

(a) The lyophilization before the heating step can be eliminated;

(b) the dialyzed material before the heating step can be heated in a buffer solution, e.g., 0.025 M tris-glycine buffer, pH 7.8, containing $10^{-3}$ M $Mg^{++}$, $10^{-4}$ M $Cu^{++}$ and $10^{-5}$ M $Zn^{++}$;

(c) The gel filtration can be conducted in the buffer solution of (b) above or in other buffer at pH 7.0–7.8, e.g., borate;

(d) The low molecular weight impurity can be removed by filtering the supernatant through a filtering medium which has no adsorptive capacity for compounds having a molecular weight above 30,000; and (e) Ammonium sulfate precipitation can be used to free the lysate of hemoglobin.

Following the procedure of Example 1, orgotein and its congeners are isolated from the red blood cells of horses, rabbits, chickens, humans and other animals in the following yields.

| Species | Yield,[1] percent | $A1_{280}^{100}$ |
| --- | --- | --- |
| Cow-steer, avg. 8 runs | 0.0101 | 2.3±0.2 |
| Calf, one run | 0.0117 | 2.3 |
| Horse, thoroughbred, avg. 4 runs | 0.0178 | 2.3 |
| Sheep, avg. 5 runs | 0.0067 | 2.5 |
| Rabbit, avg. 3 runs | 0.0079 | 1.1 |
| Chicken, avg. 4 runs | 0.0063 | 2.9 |
| Human, avg. 3 runs | 0.0015 | [2].5 |
| Rat, one run | [2] 0.0088 | [2] 2.8 |
| Guinea pig, avg. 2 runs | .0.034 | [2] 3.5 |

[1] Based on weight of packed red cells.
[2] Before complete purification.

Example 2.—Isolation of orgotein from beef blood 4000 ml. of bovine blood, obtained from local slaughterhouses and preserved in citrate solution, in Alsevers solution or with ELTA, was centifuged at our near 5,000× G at 0° C. for 20 minutes to separate the plasma from the red cells. The plasma was removed. The Alsevers solution was prepared by dissolving 24.6 g. glucose, 9.6 g. sodium citrate dihydrate, 5.04 g. sodium chloride in 1,200 ml. distilled cold water, adjusting the pH to 6.1 with citric acid and then sterilizing by millipore filtration. The separated red cells were washed 3 times by mixing one to two volumes of cold 0.9 percent sodium chloride solution, and centrifuging at or near 6,000× G at 0° C. for about 20 minutes. The yield was 1,740 ml. packed red cells.

One volume of washed red cells was lysed by mixing it with 1.1 volumes of cold·deionized water followed by sonication for several minutes (Biosonik III, No. 70 setting). The mixture was allowed to stir thereafter at 4° C. for 1 hour, or longer, to complete lysis.

0.25 volume (per volume of lysate) alcohol at −15° C. was slowly added while stiring, and then 0.31 volume (per volume of hemolystate) of chloroform at −15° C. was added to precipitate the hemoglobin. Thorough stirring was continued for about 15 minutes at or near −15° C., at which time the mixture was a thick paste. The mixture was allowed to stand at 4° C. for about 15 minutes. 0.2 volume of cold deionized water was added, giving an easily poured suspension. The precipitate and excess chloroform were removerd by centrifuging at about 12,000× G at 0° C. for about 20 minutes. The supernatant was filtered through a Versapor epoxy filter (0.9μ) giving a clear filtrate.

The hemoglobin pellet was dislodged, the chloroform beneath it discarded, the pellet broken up and re-extracted by blending for several minutes with cold deionized water in an Osterizer or similar blender. At least 0.5 volume (per volume of starting lysate) of cold deionized water was used to obtain an easily pourable suspension. The suspension was centrifuged at about 12,000× G at 0° for about 20 minutes. The supernatant was filtered through Versapor. The clear filtrate was combined with the main fraction (re-extraction I). The precipitate was again re-extracted and centrifuged as above and filtered through Versapor. The clear filtrate combined with the main fraction (re-extraction II).

The combined filtrates were lyophilized without dialysis. Yield at this stage was 14.1 g. (0.81%, calculated on the packed red cells). The lyophilized material was re-dissolved in 0.025 M tris-glycine, $10^{-2}$ M $Mn^{++}$, buffer, pH 7.6 to a concentration of about 20 mg./ml. The solution was heated at or near 65° C. in a water bath for about 15 minutes, with agitation. The precipitate from heating was removed by filtration through Versapor. The clear filtrate was dialyzed against deinized water, filtered through Millipore and lyophilized. The yield at this stage was 614 mg. (0.035%, calculated on the packed red cels). It consists largely of orgotein. The lyophilized product was redissolved to a concentration of about 50 mg./ml. in 0.03 M tris, $5 \times 10^{-3}$ M glycine buffer containing $10^{-3}$ M $Mg^{++}$, $10^{-4}$ M $Cu^{++}$, $10^{-5}$ M $Zn^{++}$, pH 7.1. The sample was loaded onto a 3.2 cm. x 105 cm. G-75 Sephadex column equilibrated with the same buffer. Flow rate was about 10 ml. per hour and fractions were collected every 100 drops (approximately 3.2 ml.).

The eluate was divided into Fractions A (tubes 81–100), B (tubes 101–107), C (tubes 108–122), D (tubes 123–135), E (tubes 136–158), F (tubes 159–180) and G (tubes 181–235). Fraction C contained the orgotein. The cut for fraction C was taken very sharply to ensure that all product recovered from fraction C was pure orgotein. Fractions B and D, which contained less pure orgotein, were pooled for re-work. Fractions C and B+D were each dialyzed against deionized water, filtered through Millipore, and lyophilized. Fractions A, E, F, G were discarded.

The amount of material in each fraction is shown below.

Fraction:

| | Yield, mg. |
|---|---|
| A | 4.5 |
| B | 21.2 |
| C | 170.0 |
| D | 11.6 |
| E | Trace |
| F | Trace |
| G | 14.4 |

The overall yield of orgotein, including 16 mg. recovered from fractions B and D, was 186 mg. (0.0107%, calculated on the packed red cells).

Example 3

The procedure of Example 2 was followed except the hemoglobin was removed from the hemolysate by adjusting the pH of the hemolysate to 6.8–7.0, adding solid $(NH_4)_2SO_4$ at 25° C. until the solution is at 47–50% of saturation, and then centrifuging at 8000 r.p.m. for 20–30 minutes.

What is claimed is:

1. In a process for isolating orgotein from a mixture of proteins by a fractionation process comprising a plurality of steps conducted below room temperature and a heating step in which the impure orgotein protein is heated in a buffer solution containing divalent metal ions until a portion of the proteins precipitate therefrom, the heating is then discontinued and the solution cooled, the precipitated proteins are removed and the orgotein protein is separated from the supernatant, the improvement which comprises
    (a) employing erythrocytes as the source of orgotein;
    (b) lysing the erythrocytes;
    (c) separating the hemoglobin from the lysate; and
    (d) heating the hemoglobin-free lysate containing the orgotein protein in the heating step until the carbonic anhydrase therein is inactivated.

2. The process of claim 1 wherein the erythrocytes are bovine.

3. The process of claim 1 wherein the buffer contains divalent metal ions having an atomic radius of from 0.69 to 0.08 A.

4. The process of claim 3 wherein the divalent metal ions are a mixture of $Mg^{++}$, $Cu^{++}$ and $Zn^{++}$ ions.

5. The process of claim 4 wherein the erythrocytes are bovine.

References Cited

FOREIGN PATENTS 6,614,177  4/1967  Netherlands _____ 260—112

WILLIAM H. SHORT, Primary Examiner

H. SCHAIN, Assistant Examiner

U.S. Cl. X.R.

260—112, 113; 424—101, 176, 177